US012766938B2

(12) United States Patent
Ragot et al.

(10) Patent No.: US 12,766,938 B2
(45) Date of Patent: Oct. 20, 2026

(54) ENERGY STORAGE MOUNTING SYSTEM FOR A VEHICLE

(71) Applicant: VOLVO TRUCK CORPORATION, Gothenburg (SE)

(72) Inventors: Sebastien Ragot, Gothenburg (SE); Jonatan Hörder, Mölndal (SE); Sondre Landvik, Gothenburg (SE); Armin Ohadi, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 335 days.

(21) Appl. No.: 18/572,302

(22) PCT Filed: Jun. 24, 2021

(86) PCT No.: PCT/EP2021/067371
§ 371 (c)(1),
(2) Date: Dec. 20, 2023

(87) PCT Pub. No.: WO2022/268324
PCT Pub. Date: Dec. 29, 2022

(65) Prior Publication Data

US 2024/0308321 A1 Sep. 19, 2024

(51) Int. Cl.
*B60K 1/04* (2019.01)

(52) U.S. Cl.
CPC ........ *B60K 1/04* (2013.01); *B60K 2001/0438* (2013.01)

(58) Field of Classification Search
CPC .............. B60K 1/04; B60K 2001/0438; B60K 2001/0455; H01M 50/207; H01M 50/244;
(Continued)

(56) References Cited

U.S. PATENT DOCUMENTS 6,547,020 B2 * 4/2003 Maus .................. H01M 50/262 180/68.5
11,043,714 B2 * 6/2021 Sloan ....................... B60K 1/04
(Continued)

FOREIGN PATENT DOCUMENTS

DE 102017007490 A1 2/2019
EP 4173864 A1 5/2023
(Continued)

OTHER PUBLICATIONS

WO-2020074105-A1 English Translation (Year: 2020).*
(Continued)

*Primary Examiner* — Michael T. Walsh
(74) *Attorney, Agent, or Firm* — Jeffri A. Kaminski; Venable LLP

(57) ABSTRACT

An energy storage mounting system for an energy storage system, ESS, of a vehicle, extends in a longitudinal direction, a transverse direction and in a vertical direction. The energy storage mounting system includes vertically spaced-apart first energy storage unit mounting member and energy storage units inter-connecting member, wherein the first energy storage unit mounting member is connectable to a first energy storage unit of the ESS, the energy storage unit mounting member comprising a connecting portion configured to connect with a vehicle mounting member; and the energy storage units inter-connecting member is connectable to the first energy storage unit of the ESS and transversely inter-connects the first energy storage unit with a transversely opposite second energy storage unit.

17 Claims, 10 Drawing Sheets

(58) Field of Classification Search
CPC ............. H01M 50/249; H01M 50/258; H01M 2220/20; B60Y 2200/14; B60Y 2200/142; Y02T 10/70
See application file for complete search history.

(56) References Cited

U.S. PATENT DOCUMENTS

| | | | | |
|---|---|---|---|---|
| 11,110,786 | B2 * | 9/2021 | Loacker | H01M 50/20 |
| 11,685,268 | B2 * | 6/2023 | Sjöholm | B62D 21/02<br>180/68.5 |
| 2003/0188903 | A1 * | 10/2003 | King | B60R 16/04<br>180/68.5 |
| 2018/0123099 | A1 * | 5/2018 | Fees | H01M 10/42 |
| 2020/0259143 | A1 * | 8/2020 | Sloan | H01M 50/262 |
| 2020/0331334 | A1 * | 10/2020 | Sloan | B60L 50/66 |
| 2021/0300476 | A1 | 9/2021 | Gonzalez Mendivil et al. | |
| 2022/0250458 | A1 | 8/2022 | Kimura et al. | |
| 2023/0001986 | A1 | 1/2023 | Hendriks | |
| 2023/0015644 | A1 | 1/2023 | Hörder et al. | |
| 2024/0075821 | A1 | 3/2024 | Lundin | |

FOREIGN PATENT DOCUMENTS

| | | | | |
|---|---|---|---|---|
| FR | 2737694 | A1 | 2/1997 | |
| SE | 539990 | C2 | 2/2018 | |
| WO | WO-2020074105 | A1 * | 4/2020 | B60L 50/66 |
| WO | 2021091448 | A1 | 5/2021 | |
| WO | 2023094320 | A1 | 6/2023 | |
| WO | 2023194779 | A1 | 10/2023 | |

OTHER PUBLICATIONS

International Search Report and Written Opinion of the International Searching Authority in corresponding International Application No. PCT/EP2021/067371 mailed Feb. 28, 2022 (13 pages).
International Preliminary Report on Patentability in corresponding International Application No. PCT/EP2021/067371 mailed Mar. 9, 2023 (7 pages).

* cited by examiner

ENERGY STORAGE MOUNTING SYSTEM FOR A VEHICLE

CROSS-REFERENCE TO RELATED APPLICATIONS

This application is a U.S. National Stage application of PCT/EP2021/067371, Jun. 24, 2021 and published on Dec. 29, 2022 as WO 2022/268324, all of which is hereby incorporated by reference in its entirety.

TECHNICAL FIELD

The present disclosure relates to an energy storage mounting system for an energy storage system. The present disclosure also relates to an energy storage system comprising such energy storage mounting system and at least one energy storage units, as well as a vehicle comprising such an energy storage mounting system. The present disclosure further relates to a method for mounting an energy storage system using the energy storage mounting system. Although the energy storage mounting system will mainly be described in relation to a heavy-duty vehicle, i.e. a truck, it may also be applicable for other types of vehicles comprising longitudinally extending frame rails at which an energy storage systems is connected.

BACKGROUND

The propulsion systems of vehicles are continuously developed to meet the demands from the market. A particular feature relates to the emission of environmentally harmful exhaust gas. Therefore, vehicles propelled by electric machines have been increasingly popular, both for cars as well as for trucks and other heavy-duty vehicles.

In relation to heavy duty vehicles, the battery connected to the electric machine arranged to propel the vehicle needs to be relatively large to be able to deliver a substantial amount of electric power to the electric machine(s), in particular when aiming for covering a long driving range without having to frequently re-charge the battery.

A conventional placement of the batteries in a heavy-duty vehicle is along the longitudinally extending frame rails of the vehicle. This is substantially the same position as used for the fuel tanks of a truck using an internal combustion engine for propulsion. However, since the batteries are relatively heavy components, the assembly/disassembly process of the batteries to a part of the vehicle chassis is rather time consuming, at least in comparison to e.g. the replacement/mounting of an empty fuel tank.

There is thus a desire to enable for a simplified and more time efficient assembly/disassembly process for energy storage systems such as batteries.

SUMMARY

It is therefore an object of the present disclosure to provide an energy storage mounting system which at least partially overcomes the above described deficiencies. The object is at least partly achieved by a system according to claim 1. The objective is also achieved by the other independent claims. The dependent claims are directed to advantageous embodiments of the disclosure.

According to a first aspect, there is provided an energy storage mounting system for an energy storage system, ESS, of a vehicle. The energy storage mounting system extends in a longitudinal direction, a transverse direction and in a vertical direction. The energy storage unit mounting system comprises vertically spaced-apart first energy storage unit mounting member and energy storage units inter-connecting member. Moreover, the first energy storage unit mounting member is connectable to a first energy storage unit of the ESS. The energy storage unit mounting member comprises a connecting portion configured to connect with a vehicle mounting member. Further, the energy storage units inter-connecting member is connectable to the first energy storage unit of the ESS. The energy storage units inter-connecting member is further configured to transversely inter-connect the first energy storage unit with a transversely opposite second energy storage unit.

By the configuration and arrangement of the first energy storage unit mounting member, it becomes possible to join a vertical upper part of the ESS to e.g. a vehicle mounting member of a longitudinal frame of the vehicle, while the energy storage units inter-connecting member allows for a simple joining of the first energy storage unit to the second energy storage unit vertically below the longitudinal frame so as to form an assembled configuration with the frame. As such, the energy storage units inter-connecting member is capable of restricting transverse movement of the first and second energy storage units away from each other, while the first energy storage unit mounting member transversely joins the first energy storage unit to the longitudinal frame so as to at least partly restrict rotational movement of the first energy storage unit relative to the longitudinal frame.

Further, the combined arrangement of the first energy storage unit mounting member and the energy storage units inter-connecting member permits the energy storage units (e.g. battery packs) to be isolated from the vehicle frame motion, thus allowing the frame to twist, and not lead forces and loads into the battery packs.

In addition, the energy storage mounting system contributes to an easier assembly of the ESS to the frame because the energy storage units can be joined to the frame and to each other from a transverse side of the vehicle, rather than from below of the vehicle. During assembly, the energy storage system can further suspend in the connecting portion(s) when the connecting portion(s) assumes a connected state with corresponding vehicle mounting member, while the energy storage units inter-connecting member is inserted into the energy storage units so as to connect them to each other and finally secure the energy storage system to the longitudinal frame. The present disclosure is thus advantageous during production of the vehicle as well as during maintenance. In other words, an additional advantage is that the assembly/disassembly process of the energy storage system to/from the vehicle is simplified.

Typically, although strictly not necessary, the energy storage mounting system comprises the vehicle mounting member connectable to a longitudinal frame of the vehicle. The vehicle mounting member comprises a mating rotational-locking element.

In addition, or alternatively, the connecting portion and the vehicle mounting member may define corresponding guide-aligning mating members configured to at least partly self-align with each other into a connecting position upon a transverse movement of the first energy storage unit of the ESS towards the longitudinal frame. An advantage is that the transition from the disconnected state to the connected state can be executed by a movement in the transverse direction. Such movement can also be executed in an easier manner compared to hitherto known sequences of connecting e.g. batteries to a vehicle frame.

Furthermore, the connecting portion may also be arranged in a number of different configurations as long as it can mate with the vehicle mounting member. Different embodiments of the connecting portion will be given below.

According to at least an example embodiment, the connecting portion comprises a rotational-locking element adapted to restrict rotation of the energy storage system when forming a rotational-locking connection with the corresponding vehicle mounting member. In addition, or alternatively, the vehicle mounting member comprises a corresponding mating rotational-locking element adapted to restrict rotation of the energy storage system when forming the rotational-locking connection with the corresponding rotational-locking element of the connecting portion.

The rotational-locking elements of the connecting portion is further configured to allow for disengagement of the rotational-locking connection from the vehicle mounting member by a movement of the connecting portion in a transverse direction.

The term rotational-locking connection refers to a connection in which the connecting portion restricts rotation of at least the energy storage unit associated with connecting portion about its center axis, which in a connected state with the frame typically corresponds Y-axis, i.e. the transvers direction. Typically, the rotational-locking connection is a connection in which the connecting portion completely prevents rotation of at least the energy storage unit associated with connecting portion about its center axis.

By way of example, the guide-aligning mating members may be complementary shaped guide-aligning mating members. The complementary shaped guide-aligning mating members can be designed in several different manners. According to at least an example embodiment, each one of complementary shaped guide-aligning mating members comprises a circumferential angled surface. To this end, a cross-sectional profile of the guide-aligning mating member has an inclined cross-sectional profile. By increasing the dimension of the cross-sectional profile in an angled manner, a self-aligning effect is achieved since the connecting portion can be slightly offset to the vehicle mounting member and guided into the vehicle mounting member via the extended width at an end cross sectional profile.

The surface of the circumferential angled surface may typically be inclined downwards towards the longitudinal frame when the connecting portion and the vehicle mounting member are connected to each other, and the connecting portion assumes the connected state. According to an example embodiment, the surface of the vehicle mounting member may thus have an inclined connecting surface arranged to mate with the inclined surface of the connecting portion. The connecting surface of the vehicle mounting member is thus preferably inclined upwards towards the energy storage system when the connecting portion and the vehicle mounting member are connected to each other and the connecting portion assumes the connected state.

It should also be noted that the first energy storage unit mounting member and the energy storage units inter-connecting member are separate components of the energy storage mounting system. In addition, in a connected state with the longitudinal frame of the vehicle, the first energy storage unit mounting member and the energy storage units inter-connecting member are separate components of the energy storage mounting system that are arranged at vertically separate locations of the ESS.

The energy storage units inter-connecting member may be configured to transversely inter-connect the first energy storage unit with an opposite second energy storage unit. Typically, the energy storage units inter-connecting member may be configured to interconnect a transverse side of the first energy storage unit with a transverse side of the second energy storage unit. By way of example, the energy storage units inter-connecting member is an elongated inter-connecting member configured to be rotatably and transversely insertable from another transverse side of the first energy storage unit towards another transverse side of the second energy storage unit, whereby the first and second energy storage units are set in an inter-connecting configuration when the elongated inter-connecting member extends transversely though the first energy storage unit and inter-connects with a part of the second energy storage unit. Typically, the elongated inter-connecting member may comprise an outer thread for engaging at least with a corresponding thread of the second energy storage unit. Hereby, the inter-connecting configuration between the first and second energy storage units is a tensioned inter-connecting configuration. By the elongated inter-connecting member, it becomes possible to connect first and second battery groups are in a tensioned manner. That is, the first and second battery groups are mounted in position by rotating the elongated inter-connecting member towards the second battery group until an end position.

According to a second aspect, there is provided an energy storage system, ESS, for a vehicle, comprising first and second energy storage units, and an energy storage mounting system according to the first aspect, wherein the first energy storage unit comprises the first energy storage unit mounting member arranged at a first vertical position for connecting to a vehicle mounting member, and wherein the energy storage units inter-connecting member is connectable to the first energy storage unit of the ESS at a second vertical position, wherein the first vertical position is vertically above the second vertical position.

Effects and features of the second aspect are largely analogous to those described above in relation to the first aspect.

Typically, in a connected state of the energy storage system, the ESS thus comprises transversely opposite first and second energy storage units. In other words, the energy storage units inter-connecting member is configured to transversely inter-connect the first energy storage unit with an opposite second energy storage unit.

According to an example embodiment, the first energy storage unit mounting member and the energy storage units inter-connecting member are configured to attach the first energy storage unit in a generally vertical orientation to the longitudinal frame of the vehicle and transversely inter-connect the first energy storage unit with the opposite second energy storage unit.

According to an example embodiment, the second energy storage unit comprises a corresponding energy storage unit mounting member having a corresponding connecting portion configured to connect with a corresponding vehicle mounting member, wherein the corresponding energy storage unit mounting member is configured to attach the second energy storage unit in a generally vertical orientation to a second transverse side of the longitudinal frame of the vehicle, while the first and second energy storage units are inter-connected by the energy storage units inter-connecting member.

Typically, the energy storage units inter-connecting member may be configured to inter-connect a first transverse side of the first energy storage unit with an opposite mating first transverse side of the second energy storage unit.

According to an example embodiment, the energy storage units inter-connecting member is an elongated inter-connecting member configured to be rotatably and transversely insertable from a second transverse side of the first energy storage unit towards a second transverse side of the second energy storage unit, whereby the first and second energy storage units are in an inter-connecting configuration when the elongated inter-connecting member extends transversely though the first energy storage unit and a substantial part through the second energy storage unit.

According to an example embodiment, the elongated inter-connecting member comprises an outer thread for engaging at least with a corresponding thread of the second energy storage unit. Hereby, the inter-connecting configuration between the first and second energy storage units is a tensioned inter-connecting configuration. According to an example embodiment, the elongated inter-connecting member comprises an engagement portion to engage with the first energy storage unit. The engagement portion may comprise a locking element. The engagement portion may engage and lock with a support structure of the first energy storage unit. Other engagement configurations are also conceivable between the elongated inter-connecting member and the energy storage unit(s).

The energy storage system may typically comprise one or several battery modules arranged to supply electric current to electric power consumer(s) of the vehicle. The battery module(s) are thus arranged within a compartment/housing which is connectable to the mounting member. By way of example, the electric power consumer may be an electric machine arranged to propel the vehicle during operation. However, the energy storage system may also be one or several fuel cells arranged within the compartment/housing connectable to the mounting member. Accordingly, the mounting member should not be construed as solely being connectable to a battery.

According to at least an example embodiment, each one of the first and second energy storage units comprises a plurality of battery packs arranged in a stack configuration along the longitudinal direction. By way of example, the battery packs are arranged in the stack configuration via a number of inter-leaved portions interconnecting longitudinal opposite arranged battery packs.

Typically, the elongated inter-connecting member may be rotatably and transversely insertable into at least one of the interleaved portions.

According to a third aspect, there is provided an arrangement for a vehicle comprising a longitudinal frame and an energy storage system according to the second aspect, wherein transversely opposite first and second energy storage units are connectable in a vertical orientation on opposite transverse sides of the longitudinal frame. Effects and features of the third aspect are also largely analogous to those described above in relation to the first aspect.

According to a fourth aspect, there is provided a vehicle comprising an energy storage mounting system according to any one of the embodiments described above in relation to the first aspect. The disclosure may also relate to a vehicle comprising an energy storage system according to any one of the embodiments described above in relation to the second aspect. The disclosure may also relate to a vehicle comprising an arrangement according to any one of the embodiments described above in relation to the third aspect. In other words, the vehicle comprises a longitudinal frame and an energy storage system, wherein the energy storage system comprises an energy storage mounting system according to any one of the embodiments described above in relation to the first aspect.

Effects and features of the fourth aspect are also largely analogous to those described above in relation to the first aspect.

According to a fifth aspect, there is provided a method for mounting an energy storage system, ESS, to a longitudinal frame of a vehicle, the longitudinal frame having a vehicle mounting member and the energy storage system comprising a plurality of energy storage units, each one of the energy storage units having a corresponding energy storage unit mounting member, wherein the ESS further comprises an energy storage units inter-connecting member, the method comprising: positioning an energy storage unit mounting member of a first energy storage unit in a facing relationship with a corresponding vehicle mounting member on a first transverse side of the longitudinal frame; transversely moving the energy storage unit mounting member towards the vehicle mounting member until a connecting portion of the energy storage unit mounting member forms a connection with the vehicle mounting member on the first transverse side; positioning an energy storage unit mounting member of a second energy storage unit in a facing relationship with a corresponding vehicle mounting member on a second transverse side of the longitudinal frame, the second transverse side being opposite arranged the first transverse side; transversely moving the energy storage unit mounting member of the second energy storage unit towards the corresponding vehicle mounting member until a connecting portion of the energy storage unit mounting member forms a connection with the corresponding vehicle mounting member on the second transverse side; and transversely interconnect the opposite first and second energy storage units by the energy storage units inter-connecting member. Effects and features of the fifth aspect are also largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1A:
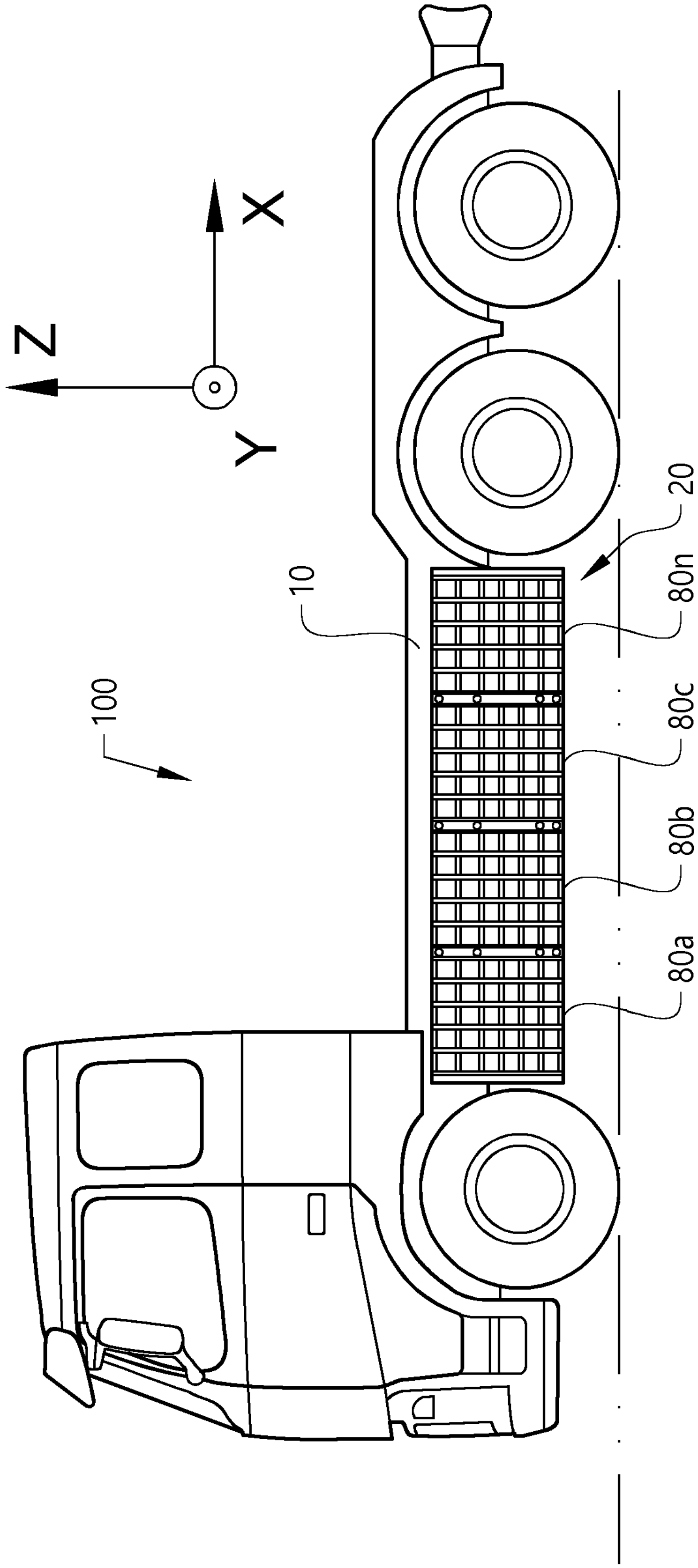
FIG. 1*a* is a perspective view illustrating a vehicle according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1*a*, there is provided a vehicle 1 in the form of a truck. The vehicle 1 comprises a frame structure composed of two longitudinal frames 10, whereby an energy storage system, ESS, 20 is connected to the longitudinal frames 10.

Figure 1B:
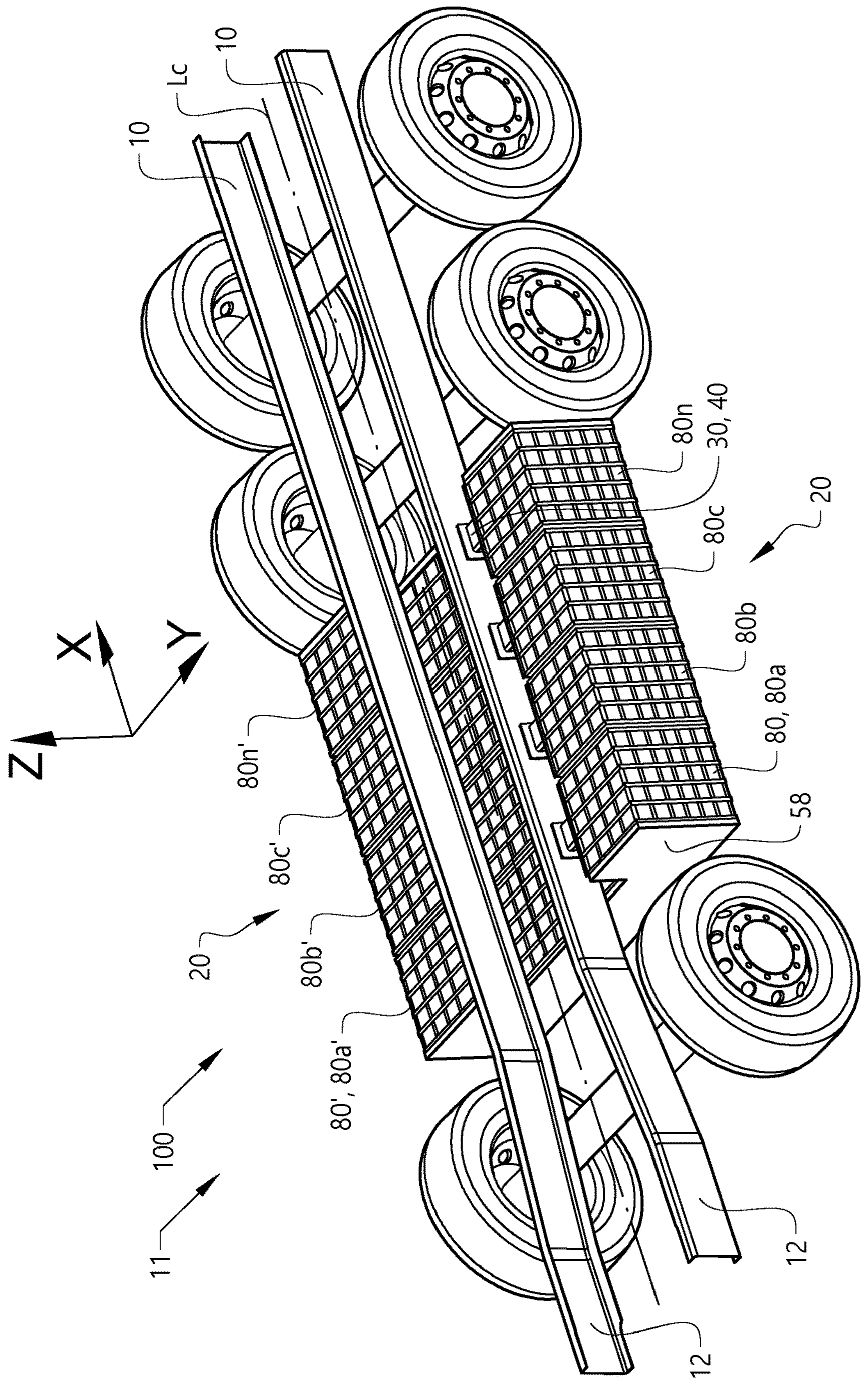
FIG. 1*b* illustrates a frame of the vehicle in FIG. 1*a*, and in particular its connection to the energy storage system and the energy storage mounting system according an example embodiment.

As depicted in FIG. 1*b*, the longitudinal frame 10 and the ESS 20 defines an arrangement 11 for the vehicle 1. As illustrated in FIGS. 1*a* and 1*b*, the arrangement 11 extends a substantial part in a longitudinal direction X, a substantial part in a transverse direction Y and a substantial part in a vertical direction Z. Analogously, the ESS 20 extends a substantial part in the longitudinal direction X, a substantial part in the transverse direction Y and a substantial part in the vertical direction Z.

The longitudinal frame 10 defines a first transverse side 14 and second transverse side 14', as illustrated in e.g. FIG. 1*b* and FIGS. 2*a* to 2*d*.

The ESS 20 is here arranged to contain an energy storage unit 80, e.g. one or more batteries, or one or more fuel cells, arranged to supply energy to an energy consumer such as a prime mover of the vehicle. When the energy storage system 20 comprises one or more batteries, the prime mover is provided in the form of an electric machine (not shown). In the example illustrated in the FIGS. 1*a* to 4, the ESS 20 comprises a plurality of energy storage units 80, 80'. As may be gleaned from FIG. 1*b*, and further in FIGS. 2*a* to 2*d*, the ESS 20 here comprises transversely opposite arranged first and second energy storage units 80, 80'. The first and second energy storage units 80, 80' are connected in a vertical orientation on opposite transverse sides 14, 14' of the longitudinal frame 10.

Similar to the ESS 20, each one of the first and second energy storage units 80, 80' extends a substantial part in the longitudinal direction X, a substantial part in the transverse direction Y and a substantial part in the vertical direction Z.

Further, as depicted in e.g. FIG. 1*b*, each one of the first and second energy storage units 80, 80' comprises a plurality of battery packs 60*a-n* (shown in FIG. 3*a*) arranged in a stack configuration along the longitudinal direction X. By way of example, the energy storage units 80*a-n* and/or the battery packs 60*a-n* are arranged in the stack configuration via a number of inter-leaved portions 58 interconnecting longitudinal opposite arranged battery packs, as illustrated in e.g. FIGS. 2*a* to 2*d*, but also in e.g. FIG. 3*b*. Thus, the ESS 20 here comprises a plurality of inter-leaved portions 58. It should be readily appreciated that the battery packs 60*a-n* may likewise be arranged in a stack configuration by other connection arrangements. In addition, the battery packs 60*a-n* may be arranged in a stack configuration by directly connecting the battery packs to each other, i.e. directly connecting a side of one battery pack to another adjacent side of another battery pack along the longitudinal direction X.

Figure 2A:
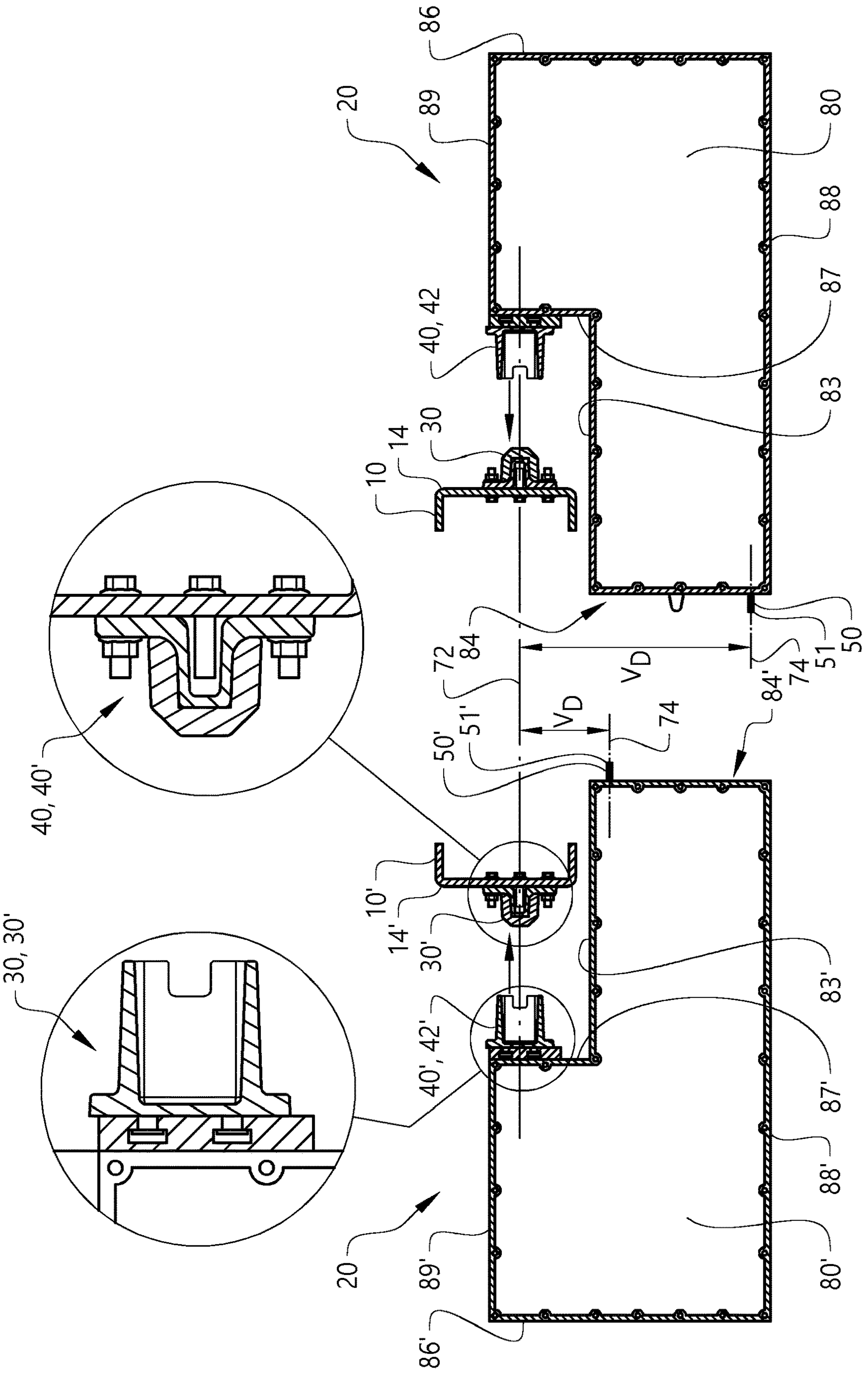
FIGS. 2*a*-2*d* illustrate some parts of the energy storage mounting system and the arrangement of the energy storage mounting system when connecting an energy storage system to the frame of the vehicle according to an example embodiment.
Figure 2B:
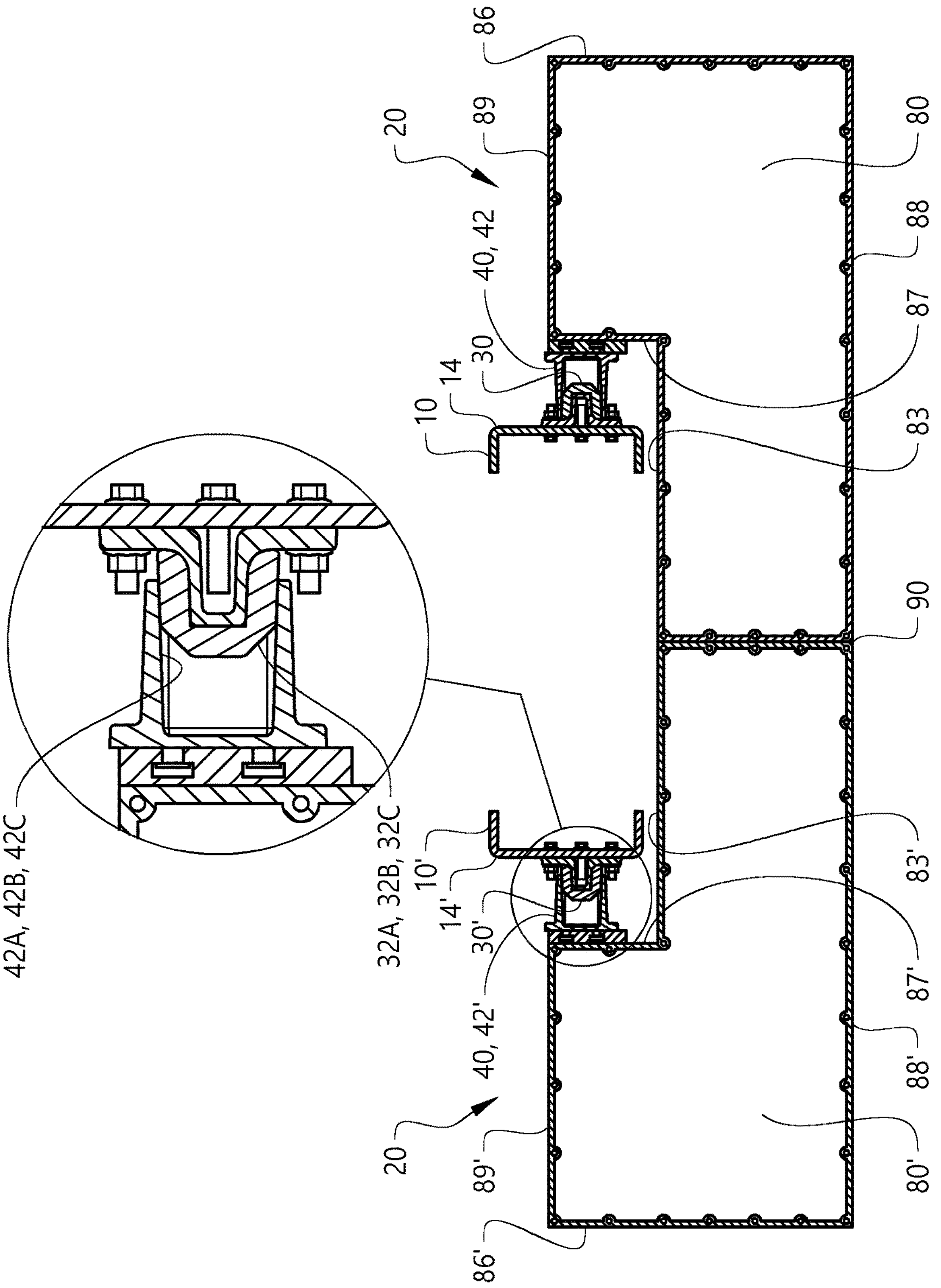

As depicted in e.g. FIGS. 2*a* and 2*b*, the first energy storage unit 80 comprises a first transverse side 84 and second transverse side 86. Analogously, the second energy storage unit 80' comprises a first transverse side 84' and a second transverse side 86'. The first transverse side 84 and the first transverse side 84' are arranged on opposite transverse sides of the longitudinal center line $L_c$. In addition, in this example, the first transverse side 84 and the first transverse side 84' are opposite mating sides. Thus, the second transverse side 86 of the first energy storage unit 80 and the second transverse side 86' of the second energy storage unit 80' are arranged away from each other, and thus regarded as the transverse outermost sides.

Moreover, the first energy storage unit 80 is here shaped with an upper cut or step to partly enclose a bottom part of the vehicle frame. The step is defined by an upper transverse side 87 and a first vertical side 83. In addition, the first energy storage unit 80 comprises an uppermost vertical side 89 and a bottom vertical side 80.

Analogously, the second energy storage unit 80' is here shaped with a corresponding upper cut or step to partly enclose another side of the bottom part of the vehicle frame. The step is defined by an upper transverse side 87' and a first vertical side 83'. In addition, the second energy storage unit 80' comprises an uppermost vertical side 89' and a bottom vertical side 88'.

As such, the shape of the first energy storage unit 80 is defined by the first transverse side 84, upper transverse side 87, first vertical side 83, uppermost vertical side 89, second transverse side 86 and the bottom vertical side 80. Analogously, the shape of the second energy storage unit 80' is defined by the first transverse side 84', upper transverse side 87', first vertical side 83', uppermost vertical side 89', second transverse side 86' and the bottom vertical side 88'.

The ESS 20 further comprises an energy storage mounting system 100 according to any one of the examples described herein in relation to FIGS. 1*a* to 4. Typically, each one of the first and second energy storage units 80, 80' are connected to the frames by at least one energy storage mounting system 100. In other examples, a number of energy storage units may be connected to the frame 10 by means of a plurality of energy storage mounting systems 100.

Similar to the ESS 20, the energy storage mounting system 100 extends a substantial part in the longitudinal direction X, a substantial part in the transverse direction Y and a substantial part in the vertical direction Z.

According to the example depicted in FIG. 1*b*, the energy storage mounting system 100 is arranged on an outside surface 12 of the longitudinal frame 10. Hence, the outside surface 12 of the first longitudinal frame faces away from the outside surface 12 of the second longitudinal frame. The outside surfaces 12 typically corresponds to the opposite transverse sides 14, 14', as mentioned above.

Turning again to FIG. 1*b*, which is a perspective view illustrating the energy storage mounting system 100 connecting the energy storage system 20 to the frame 10 in further detail. As may be gleaned from FIG. 1*b*, and also FIGS. 3*c* to 3*d*, the energy storage system 20 is connected to the frame 10 by means of the plurality of energy storage mounting systems 100, in FIG. 1*b* exemplified as four energy storage mounting systems 100 on each side of the pair longitudinal frames 10.

As further depicted in FIG. 1*b*, in conjunction with FIGS. 2*a* to 2*d*, the energy storage mounting systems 100 comprises a vehicle mounting member 30 connected to the outside surface 12 of the frame 10, and an energy storage unit mounting member 40 connected to the energy storage system 20. The vehicle mounting member 30 can be connected to the outside surface 12 by means of bolts or the like. Analogously, the energy storage unit mounting member 40 can be connected to the energy storage unit of the ESS 20 by means of corresponding bolts or the like. In this example, the energy storage unit mounting member 40 is connected to the upper transverse side 87 of the first energy storage unit 80.

Moreover, the energy storage mounting systems 100 comprises an energy storage units inter-connecting member 50 configured to inter-connect the first energy storage unit 80 with the second energy storage unit 80'. The ESS 20 is thus connected to the longitudinal frames 10, while a substantial part of the ESS 20 is arranged below the longitudinal frames 10. In addition, energy storage units of the ESS are transversely interconnected to each other vertical below the longitudinal frames 10. In particular, the energy storage system 20 extends between, and vertical below the pair of longitudinal frames 10.

In order to describe the energy storage mounting system 100 in further detail, reference is made to FIGS. 2*a*-4. With particular reference to FIGS. 2*a*-2*d*, the first energy storage unit 80 comprises a first energy storage unit mounting member 40. The first energy storage unit mounting member 40 is arranged at a first vertical position 72 for connecting to the vehicle mounting member 30. In addition, the energy storage units inter-connecting member 50 is connectable to the first energy storage unit 80 of the ESS 20 at a second vertical position 74. As depicted in e.g. FIGS. 2*a* and 2*b*, the first vertical position 72 is vertically above the second vertical position 74. In other words, the first energy storage unit mounting member 40 and the energy storage units inter-connecting member 50 are arranged vertically spaced apart. In this context, the term vertically spaced apart refers to that the first energy storage unit mounting member 40 is arranged to be vertically spaced apart from the energy storage units inter-connecting member 50 by a vertical distance VD, as illustrated in FIG. 2*a*, when the inter-connecting member 50 is inserted into the first energy storage unit 80 so as to form the inter-connecting configuration with the second energy storage unit 80'.

Accordingly, a vertical plane across first vertical position 72 is spaced apart from a vertical plane across the second vertical position 74 with the distance VD.

Moreover, the first energy storage unit mounting member 40 and the energy storage units inter-connecting member 50 are separate parts of the energy storage mounting system 100.

Also, the first energy storage unit mounting member 40 and the energy storage units inter-connecting member 50 are configured to attach the first energy storage unit 80 in a generally vertical orientation to the longitudinal frame 10 of the vehicle, as illustrated in FIGS. 2*a* to 2*d*.

Turning again to the energy storage unit mounting member 40, as depicted in e.g. FIG. 2*b*, the energy storage unit mounting member 40 comprises a connecting portion 42 configured to connect with the vehicle mounting member 30. The connecting portion 42 comprises a rotational-locking element 42A adapted to prevent rotation of the ESS 20 when forming a rotational-locking connection with the corresponding vehicle mounting member 30.

Analogously, the vehicle mounting member 30 comprises a corresponding rotational-locking element 32. The rotational-locking elements 32 of the vehicle mounting member 30 and the connecting portion 42 can be designed in several different manners in order to provide a suitable rotational-locking connection as long as the connection is capable of preventing rotation of the first energy storage unit 80 in a plane defined by the transverse and vertical directions Y and Z, i.e. prevent rotation of the first energy storage unit about its Y-axis (corresponding to a transverse axis). By way of example, the rotational-locking elements are provided by having complementary cross-sectional profiles of the vehicle mounting member 30 and the connecting portion 42, as illustrated in e.g. FIGS. 2*b* to 2*d*, and further described hereinafter. Moreover, the rotational-locking element 42A is further configured to allow for disengagement of the rotational-locking connection by a movement of the connecting portion 42 in the transverse direction Y.

In addition, the connecting portion 42 here defines a guide-aligning mating member 42B. The guide-aligning mating member has a circumferential angled surface 42C.

Figure 2D:
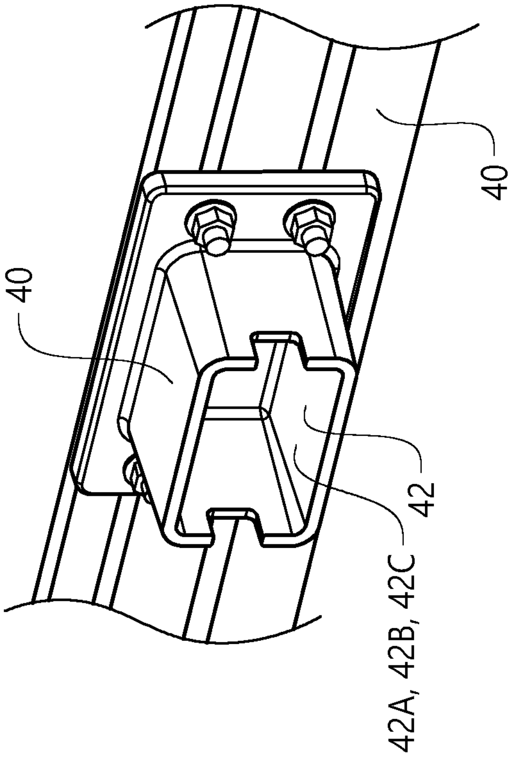
Figure 2C:
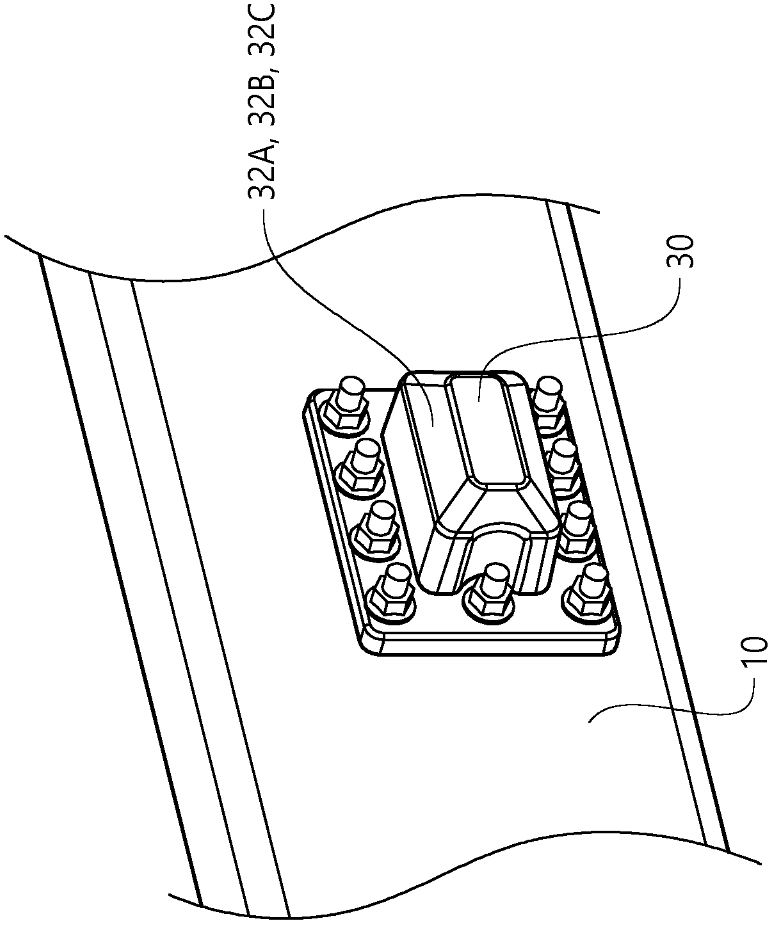

Analogously, the vehicle mounting member 30 here defines a corresponding guide-aligning mating member 32B. The guide-aligning mating member 32B has a circumferential angled surface 32C. As illustrated in FIGS. 2*c* and 2*d*, the guide-aligning mating members 32B, 43B are complementary shaped guide-aligning mating members. That is, the guide-aligning mating member 32B comprises a cross-sectional profile defined by the circumferential angled surface 32C that has a slightly larger circumferential profile than a cross-sectional profile of the guide-aligning mating member 42B defined by the circumferential angled surface 42C, as depicted in FIGS. 2*c* and 2*d*. Hence, the guide-aligning mating member 42B and guide-aligning mating member 32B are complementary shaped guide-aligning mating members having complementary circumferential angled surfaces, wherein the guide-aligning mating member 42B fits inside the guide-aligning mating member 32B. The guide-aligning mating member 42B of the connecting portion 42 is here a cup-shaped portion and the guide-aligning mating member 32B of the vehicle mounting member is a form of a bushing (cylindrical lining), as depicted in the FIGS. 2*b* to 2*d*.

As such, the guide-aligning mating member 42B of the connecting portion 42 is adapted to slide onto the (inner) circumferential angled surface 32C of the vehicle mounting member 30 when the connecting portion 42 is inserted into the space defined by the cross-sectional profile of the guide-aligning mating member 32B from a transverse side. In other words, the corresponding guide-aligning mating members 32B, 42B are configured to self-align with each other into a connecting position (as depicted in e.g. FIG. 2*b*) upon a transverse movement of the first energy storage unit 80 of the ESS 20 towards the longitudinal frame 10 until the connecting portion 42 is in an end position relative to the vehicle mounting member 30. By way of example, only, the circumferential angled surfaces 32C, 42C of the vehicle mounting member 30 and the connecting portion 42 may allow for an initial misalignment of the connecting portion 40 relative to the member 30 by about 1-2 cm, at the insertion state (FIG. 2*a*), while still be capable of guiding and aligning the connecting portion 40 relative to the member 30 into a correct position, as depicted in FIG. 2*b*.

Accordingly, by means of the circumferential angled surfaces 32C, 42C, the corresponding guide-aligning mating members are configured to self-align with each other into the connecting position (as depicted in e.g. FIG. 2*b*) upon the transverse movement of the first energy storage unit 80 of the ESS 20 towards the longitudinal frame 10. Further, by having a number energy storage system mounting system 100 arranged on one and the same side of the frame 10, it may also be possible to nearly avoid rotation around both the Y-axis and the Z-axis.

Turning again to FIGS. 2*a* to 2*d*, the energy storage system mounting system 100 comprises the energy storage units inter-connecting member 50. For ease of reference, the energy storage units inter-connecting member 50 may simply be denoted as the inter-connecting member 50 throughout the description of the examples.

The inter-connecting member 50 is connectable to the first energy storage unit 80 of the ESS 20. Moreover, the inter-connecting member is here a first inter-connecting member 50 that is configured to transversely inter-connect the transverse opposite first and second energy storage units 80, 80'. More specifically, the first inter-connecting member 50 is configured to interconnect a transverse side of the first energy storage unit 80 with a transverse side of second energy storage unit 80'. As illustrated in FIGS. 2*a* to 2*d*, the energy storage units inter-connecting member 50 is configured to inter-connect the first transverse side 84 of the first energy storage unit with the opposite mating first transverse side 84' of the second energy storage unit. Generally, the inter-connecting member 50 is configured to inter-connect the first energy storage unit with the second energy storage unit by one or more threaded engagement portions, as further described herein.

While the inter-connecting member 50 can be designed and provided in several different manners, the inter-connecting member is here an elongated inter-connecting member. The elongated inter-connecting member 50 is configured to be rotatably and transversely insertable from the second transverse side 86 of the first energy storage unit towards the second transverse side 86' of the second energy storage unit. As such, the first and second energy storage units 80, 80' are in an inter-connecting configuration 90 when the elongated inter-connecting member 50 extends transversely though the first energy storage unit 80 and connects with the first energy storage unit 80 and the second energy storage unit 80', as illustrated in e.g. FIG. 3. In some examples, the inter-connecting portion 50 may extend a substantial part through the second energy storage unit.

The elongated inter-connecting member 50 is configured to engage with a corresponding engagement part of the second energy storage unit 80'. By way of example, the elongated inter-connecting member 50 comprises an outer thread 51 for engaging at least with a corresponding thread 56' of the second energy storage unit 80'. In addition, the elongated inter-connecting member comprises an engagement portion 57 to engage with the first energy storage unit 80. The engagement portion 57 may comprise a locking element, as illustrated in FIG. 3*d*. The engagement portion 57 may connect and lock with a support structure 52, arranged on the first energy storage unit 80. Other engagement configurations are also conceivable between the elongated inter-connecting member and the energy storage unit(s).

By the corresponding threads, there is provided a tensioned inter-connecting configuration. In other words, the inter-connecting configuration between the first and second energy storage units 80, 80' defines a tensioned inter-connecting configuration.

As illustrated in FIGS. 2*a* to 2*d*, the elongated inter-connecting member 50 is rotatably and transversely insertable into at least one of the inter-leaved portions. By way of example, each one of the inter-leaved portions comprises a number of transversely spaced apart supports 52, 54 for guiding the elongated inter-connecting member into its inter-connecting configuration with the opposite ESS unit 80'. Moreover, as illustrated in FIGS. 2*a* to 2*d*, the system here further comprises an additional elongated inter-connecting member 50' which is rotatably and transversely insertable into an inter-leaved portion of the second energy storage unit 80'. By way of example, the inter-leaved portion comprises a number of transversely spaced apart supports 52', 54' for guiding the elongated inter-connecting member 50' into its inter-connecting configuration with the opposite ESS unit 80.

Similar to the configuration of the first energy storage unit 80, the second energy storage unit 80' comprises a corresponding energy storage unit mounting member 40', as depicted e.g. in FIGS. 1*b*, 2*a* to 2*d* and 3*a* to 3*d*. The energy storage unit mounting member 40' comprises a corresponding connecting portion 42' configured to connect with a corresponding vehicle mounting member 30'. The corresponding vehicle mounting member 30' is arranged on the transverse side 14' of the longitudinal frame 10, as illustrated in e.g. FIG. 2*b*.

Further, the corresponding energy storage unit mounting member 40' is configured to attach the second energy storage unit in a generally vertical orientation to the second transverse side 14' of the longitudinal frame 10 of the vehicle. In this example, the energy storage unit mounting member 40' is connected to the upper transverse side 87' of the second energy storage unit 80'. It may also be connected by means of bolts of the like.

Moreover, the first and second energy storage units 80, 80' are inter-connected by the energy storage units inter-connecting members 50, 50', as described above.

In other words, the energy storage unit mounting member 40' and the energy storage units inter-connecting member 50 are arranged vertically spaced apart. In a similar vein, the energy storage unit mounting member 40' and the energy storage units inter-connecting member 50' are arranged vertically spaced apart.

Moreover, the energy storage unit mounting member 40', the energy storage units inter-connecting member 50 and the energy storage units inter-connecting member 50' are separate parts of the energy storage mounting system 100.

As illustrated in e.g. FIG. 2*a* in conjunction with 2*b*, the energy storage unit mounting member 40 and the energy storage unit mounting member 40' are arranged on the same vertical position 72. In addition, the vehicle mounting member 30 and the vehicle mounting member 30' are arranged on the same vertical position 72. Hence, the connection between the energy storage unit mounting member 40 and the vehicle mounting member 30 and the connection between the energy storage unit mounting member 40' and the vehicle mounting member 30', respectively, are positioned in the same vertical position 72, and which is vertically spaced apart from the second vertical position 74. In an example where the system comprises a number of energy storage units inter-connecting members 50, 50', as illustrated in FIG. 2*a*, each one of the energy storage units inter-connecting members 50, 50' are arranged at a vertical position, e.g. 74 and 74' that are vertically spaced apart from the vertical position 72. In addition, any one of the vertical positions 74 and 74' are vertically below the first vertical position 72. Accordingly, the first vertical position 72 is an upper vertical position while the second vertical position 74, 74' is a lower vertical position in relation to the first vertical position 72.

The following will now, with reference to FIGS. 3*a*-3*d*, describes the procedure of mounting the energy storage system 20 to the longitudinal frame 10 of the vehicle 1.

Figure 3A:
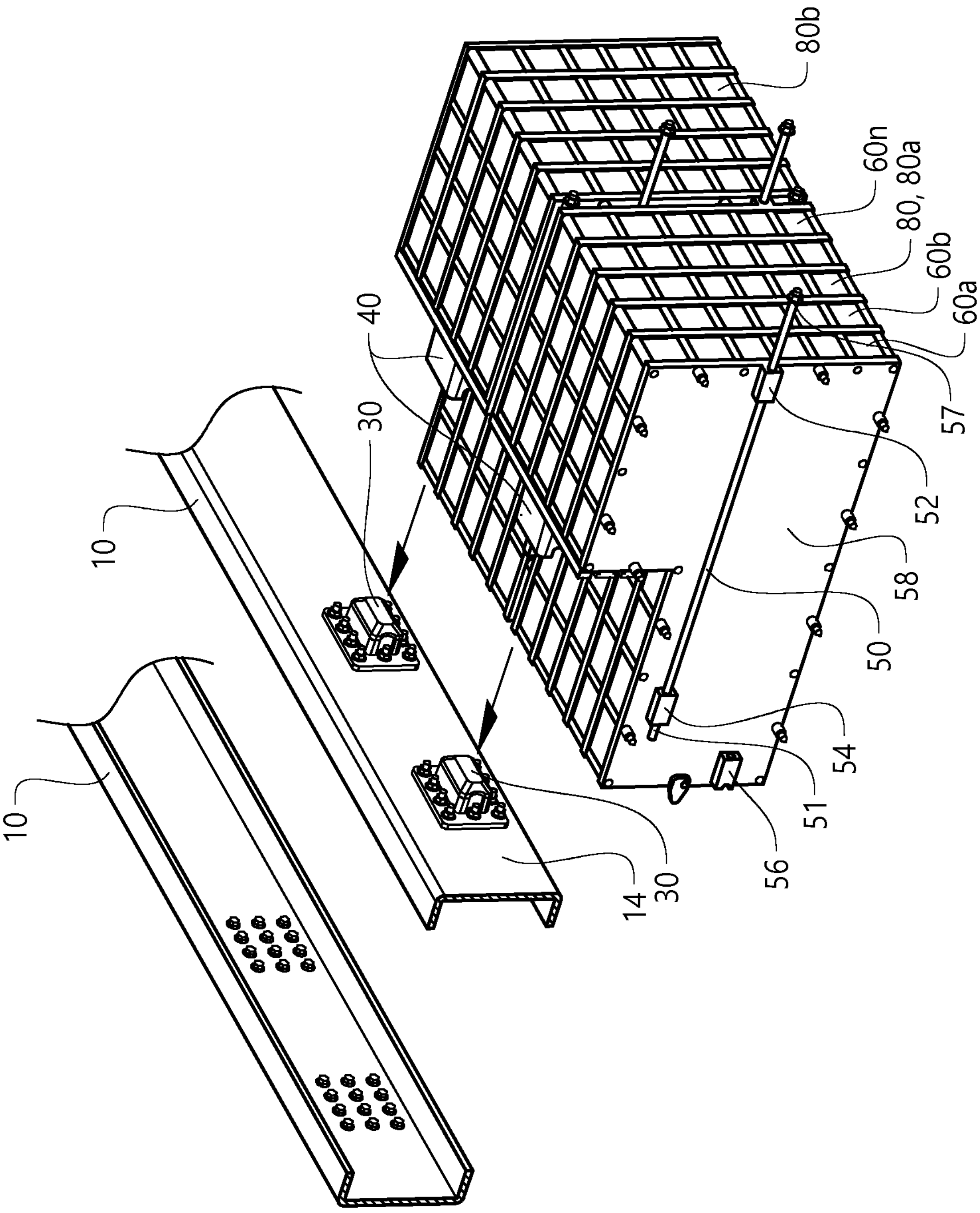
FIGS. 3*a*-3*d* illustrate an example embodiment of the assembly process of mounting the energy storage system to the frame of the vehicle according to an example embodiment.

As can be seen in FIG. 3*a*, a first energy storage unit 80 of the energy storage system 20 is arranged in its final position, but still not sufficiently connected to the longitudinal frame 10. The first energy storage unit mounting member 40 is arranged in vertical alignment with the energy storage units inter-connecting member 50. Subsequently, upon a transverse movement of the first energy storage unit 80 of the ESS 20 towards the longitudinal frame 10, the connecting portion 42 of the first energy storage unit mounting member 40 is insertable into the vehicle mounting member 30. Further, by the guide-aligning member of the first energy storage unit mounting member 40 and the vehicle mounting member 30, the connecting portion 42 and the mounting member 30 are capable to self-align with each other into the connecting position (as depicted in FIG. 2*d*) upon the transverse movement of the first energy storage unit 80 of the ESS 20 towards the longitudinal frame 10.

Figure 3B:
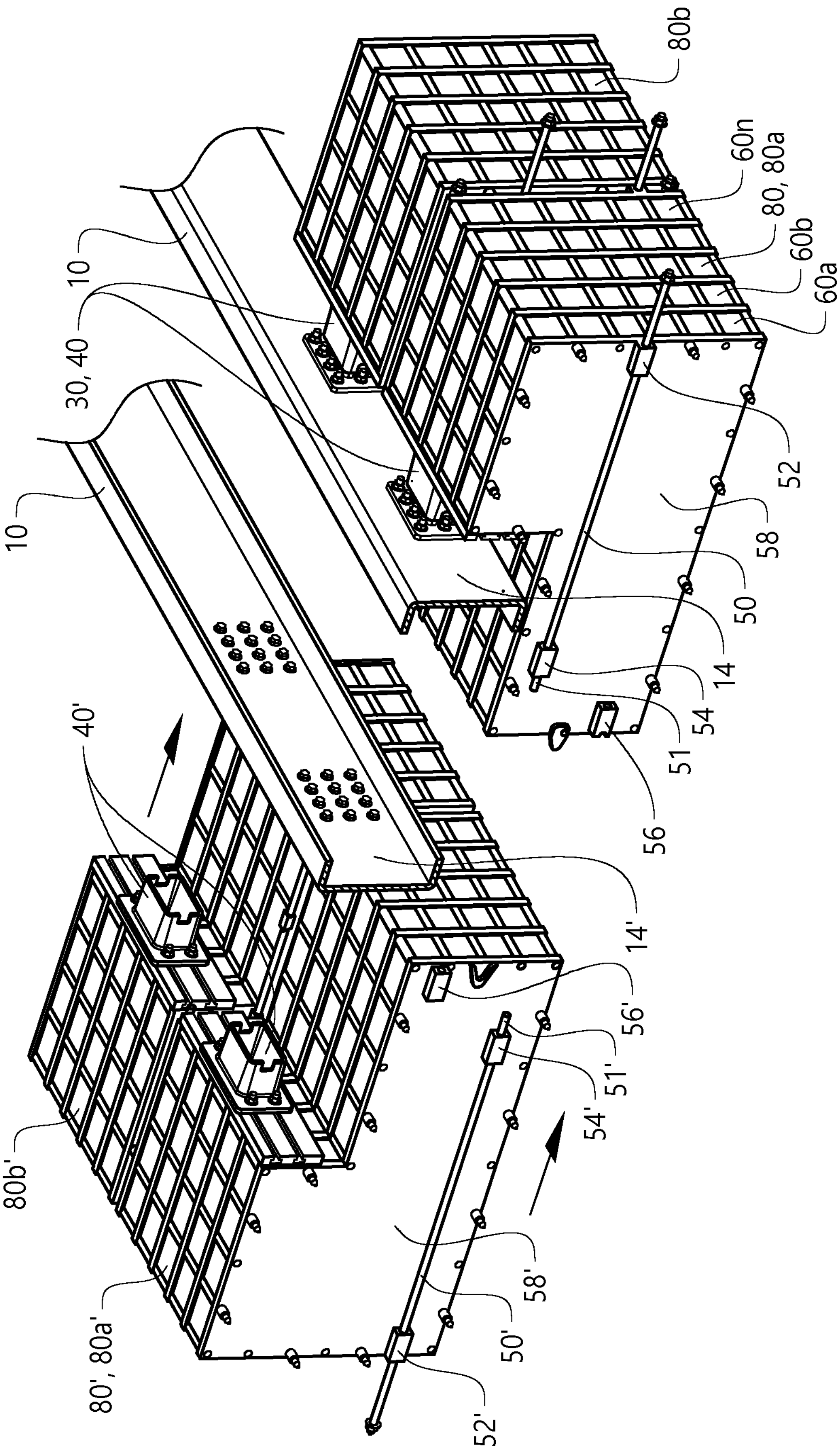

Then, as illustrated in FIG. 3*b*, when the connecting portion 42 is arranged inside the vehicle mounting member 30 in the connection state, a second energy storage unit 80 of the energy storage system 20 is to be arranged in its final position and subsequently moved in the transverse direction towards the other side of the longitudinal frame 10. The connection of the second energy storage unit 80 to the frame 10 is provided in a similar sequence and by similar components as described above in relation to the connection of the first energy storage unit 80 to the frame 10.

Figure 3C:
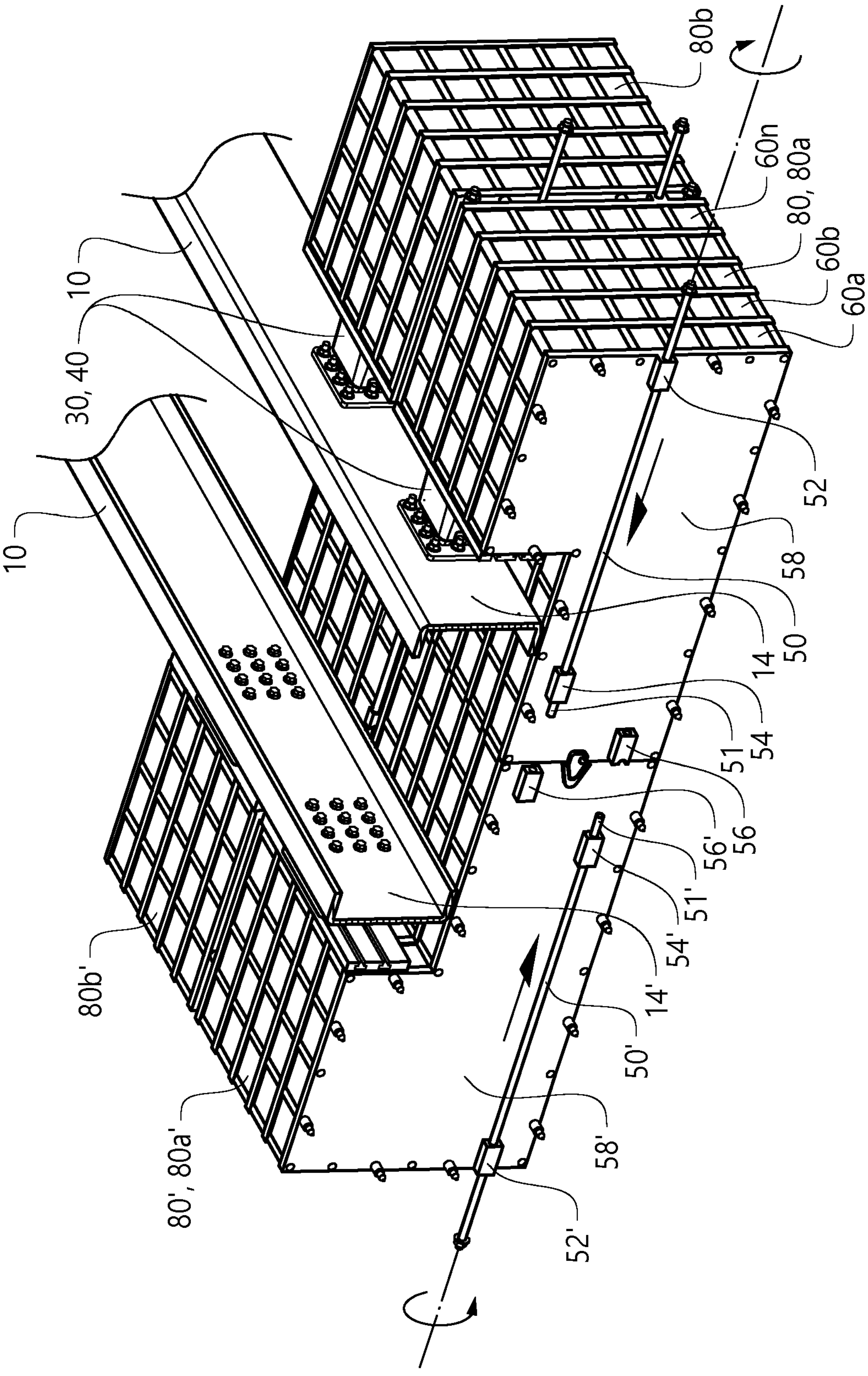
Figure 3D:
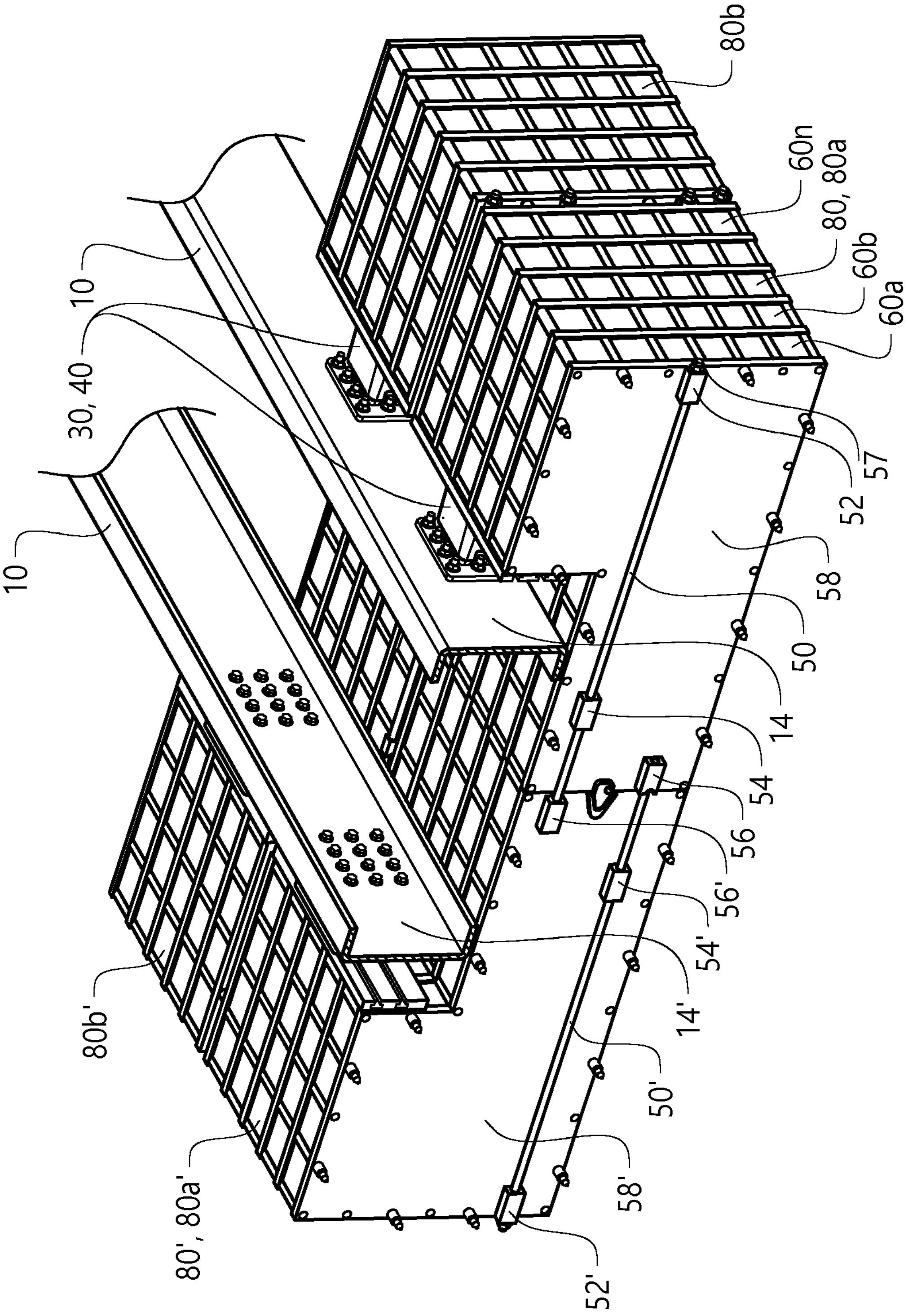

Thereafter, two energy storage units inter-connecting members 50, 50' are transitioned from their disconnected state, depicted in FIG. 3*c*, to their connected state depicted in FIG. 3*d*. The inter-connecting members 50, 50' have been moved from their disconnected state to their connected state by means of a rotational movement, so as to engage with the threaded portions 56, 56', as described above.

As illustrated in FIG. 3*c*, the inter-connecting configuration 90 is provided by rotatably and transversely insert one or more elongated inter-connecting members 50, 50', e.g. from the second transverse side 86 of the first energy storage unit 80 towards the second transverse side 86' of the second energy storage unit 80'. The first and second energy storage units 80, 80' are thus in the inter-connecting configuration 90 when the elongated inter-connecting member 50 extends transversely though the first energy storage unit 80 and a substantial part through the second energy storage unit 80', as illustrated in e.g. FIG. 3*d*. In other words, the energy storage units inter-connecting member 50 is configured to inter-connect the first transverse side 84 of the first energy storage unit with the opposite mating first transverse side 84' of the second energy storage unit.

Hence, in an example with right- and left-hand-side (RHS, LHS) groups of battery packs, it should be noted that they are joined to each other along a central line, LC, below the longitudinal frame 10, as depicted in e.g. FIG. 1*b* or FIG. 2*b*.

Further, by means of the corresponding rotational-locking elements 42A, 32A, the ESS 20 is connected to the frame 10 in the rotational-locking configuration so as to prevent rotation of the ESS 20. In addition, when the ESS 20 is connected to the longitudinal frame by means of an energy storage mounting system 100 comprising a number of connecting portions 42 and vehicle frame mounting portions 30 along the longitudinal direction X, it may be even be possible to lock the ESS 20 against rotation around an Z-axis, as extending in the vertical direction.

Figure 4:
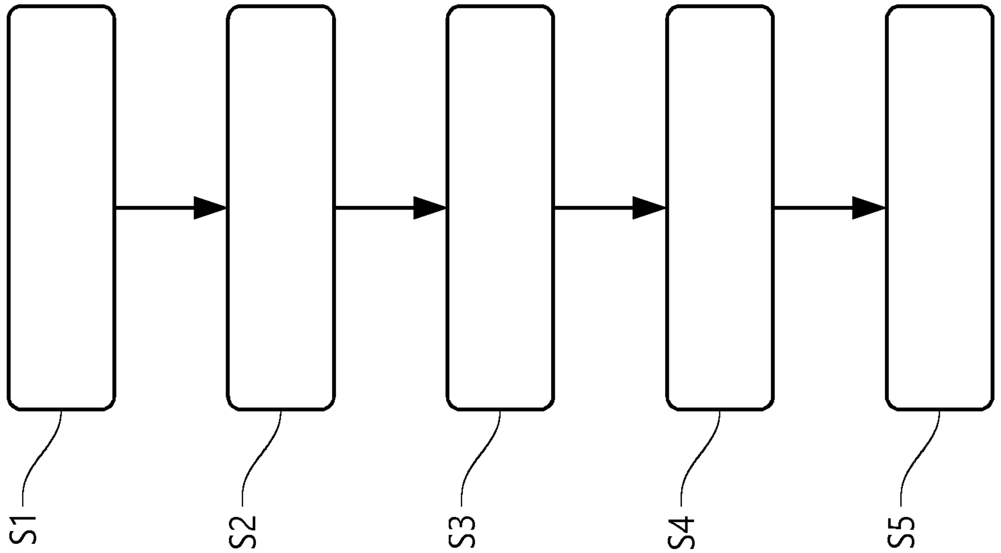
FIG. 4 is a flow chart of the method for mounting the energy storage system to the longitudinal frame.

In order to sum up, reference is made to FIG. 4 which is a flow chart of a method for mounting the energy storage system to the longitudinal frame of the vehicle. In a first step, the energy storage unit mounting member of the first energy storage unit is positioned S1 in a facing relationship with the corresponding vehicle mounting member on the first transverse side of the longitudinal frame. Thereafter, the energy storage unit mounting member is transversely moved S2 towards the vehicle mounting member until the connecting portion of the energy storage unit mounting member forms the connection with the vehicle mounting member on the first transverse side. Further, the energy storage unit mounting member of the second energy storage unit is positioned S3 in a facing relationship with the corresponding vehicle mounting member on the second transverse side of the longitudinal frame, the second transverse side being opposite arranged the first transverse side. Then, the energy storage unit mounting member of the second energy storage unit is transversely moved S4 towards the vehicle mounting member until the connecting portion of the energy storage unit mounting member forms the connection with the vehicle mounting member on the second transverse side. Subsequently, the opposite first and second energy storage units are transversely inter-connected S5 by the energy storage units inter-connecting member.

Accordingly, the examples of the FIGS. 1 to 4 further relate to the vehicle 1 comprising the arrangement 11 including the longitudinal frame 10 and the energy storage system 20. In addition, the examples of the FIGS. 1 to 4 relate to the vehicle 1 comprising at least one ESS 20. In addition, the examples of the FIGS. 1 to 4 relate to the vehicle 1 comprising at least one ESS mounting system 40.

It is to be understood that the present disclosure is not limited to the embodiments described above and illustrated in the drawings; rather, the skilled person will recognize that many changes and modifications may be made within the scope of the appended claims. By way of example, the shapes of the energy storage units may necessarily not be shaped as illustrated in the Figures, but other shapes and dimensions are also conceivable. Likewise, the energy storage unit mounting member 40 may necessarily not always be arranged on an upper vertical side of the energy storage, but may likewise be arranged on an upper transverse side of the unit.

The invention claimed is:

1. An energy storage system ("ESS") for a vehicle, comprising a first energy storage unit and a second energy storage unit and an energy storage mounting system, the energy storage system extending in a longitudinal direction, a transverse direction and in a vertical direction, the energy storage mounting system comprising vertically spaced-apart first energy storage unit mounting member and energy storage units inter-connecting member, wherein the first energy storage unit mounting member is connectable to the first energy storage unit of the ESS, and further being arranged at a first vertical position for connecting to a vehicle mounting member, the energy storage unit mounting member comprising a connecting portion configured to connect with a vehicle mounting member; and the energy storage units inter-connecting member is connectable to the first energy storage unit of the ESS at a second vertical position, wherein said first vertical position is vertically above said second vertical position, and further configured to transversely inter-connect the first energy storage unit with a transversely opposite second energy storage unit, wherein the energy storage units inter-connecting member is an elongated inter-connecting member configured to be rotatably and transversely insertable from a second transverse side of the first energy storage unit towards a second transverse side of the second energy storage unit, whereby the first and second energy storage units are set in an inter-connecting configuration when said elongated inter-connecting member extends transversely through the first energy storage unit and inter-connect with a part of the second energy storage unit.

2. The energy storage system according to claim 1, wherein the connecting portion comprises a rotational-locking element adapted to restrict rotation of the energy storage system when forming a rotational-locking connection with the corresponding vehicle mounting member.

3. The energy storage system according to claim 1, further comprising the vehicle mounting member connectable to a longitudinal frame of the vehicle, said vehicle mounting member comprising a mating rotational-locking element.

4. The energy storage system according to claim 1, wherein the connecting portion and the vehicle mounting member define corresponding guide-aligning mating members configured to at least partly self-align with each other into a connecting position upon a transverse movement of the first energy storage unit of the ESS towards the longitudinal frame.

5. The energy storage system according to claim 4, wherein the guide-aligning mating members are complementary shaped guide-aligning mating members.

6. The energy storage system according to claim 1, wherein the first energy storage unit mounting member and the energy storage units inter-connecting member are configured to connect the first energy storage unit in a generally vertical orientation to the longitudinal frame of the vehicle and transversely inter-connect the first energy storage unit with the second energy storage unit opposite the first energy storage unit.

7. The energy storage system according to claim 1, wherein the second energy storage unit comprises a corresponding energy storage unit mounting member having a corresponding connecting portion configured to connect with a corresponding vehicle mounting member, wherein the corresponding energy storage unit mounting member is configured to attach the second energy storage unit in a generally vertical orientation to a second transverse side of the longitudinal frame of the vehicle, while the first and second energy storage units are inter-connected by the energy storage units inter-connecting member.

8. The energy storage system according to claim 1, wherein the energy storage units inter-connecting member is configured to inter-connect a first transverse side of the first energy storage unit with an opposite mating first transverse side of the second energy storage unit.

9. The energy storage system according to claim 1, wherein the elongated inter-connecting member comprises an outer thread for engaging at least with a corresponding thread of the second energy storage unit.

10. The energy storage system according to claim 1, wherein each one of the first and second energy storage units comprises a plurality of battery packs arranged in a stack configuration along the longitudinal direction.

11. The energy storage system according to claim 10, wherein the plurality of battery packs is arranged in the stack configuration via a number of inter-leaved portions interconnecting longitudinal opposite arranged battery packs.

12. The energy storage system according to claim 11, wherein the elongated inter-connecting member is rotatably and transversely insertable into at least one of the interleaved portions.

13. An arrangement for a vehicle comprising a longitudinal frame and the energy storage system according to claim 1, wherein the first energy storage unit and the second energy storage unit are connectable in a vertical orientation on opposite transverse sides of the longitudinal frame.

14. A vehicle comprising an energy storage system according to claim 1.

15. A method for mounting an energy storage system ("ESS") to a longitudinal frame of a vehicle, said longitudinal frame having a vehicle mounting member and the energy storage system comprising a plurality of energy storage units, each energy storage unit of the plurality of energy storage units having a corresponding energy storage unit mounting member, wherein the ESS further comprises an energy storage units inter-connecting member, the method comprising:

positioning an energy storage unit mounting member of a first energy storage unit in a facing relationship with a corresponding vehicle mounting member on a first transverse side of the longitudinal frame;

transversely moving the energy storage unit mounting member towards the vehicle mounting member until a connecting portion of the energy storage unit mounting member forms a connection with the vehicle mounting member on the first transverse side;

positioning an energy storage unit mounting member of a second energy storage unit in a facing relationship with a corresponding vehicle mounting member on a second transverse side of the longitudinal frame, the second transverse side being opposite arranged the first transverse side;

transversely moving the energy storage unit mounting member of the second energy storage unit towards the corresponding vehicle mounting member until a connecting portion of the energy storage unit mounting member forms a connection with the corresponding vehicle mounting member on the second transverse side, wherein the connecting portion is an elongated inter-connecting member configured to be rotatably and transversely insertable from the second transverse side of the first energy storage unit towards the second transverse side of the second energy storage unit; and transversely inter-connecting the opposite first and second energy storage units by the energy storage units inter-connecting member, whereby the first and second energy storage units are inter-connected when said elongated inter-connecting member extends transversely through the first energy storage unit and inter-connects with the second energy storage unit.

16. An energy storage system ("ESS") for a vehicle, comprising a first energy storage unit and a second energy storage unit and an energy storage mounting system, the energy storage system extending in a longitudinal direction, a transverse direction and in a vertical direction, the energy storage mounting system comprising vertically spaced-apart first energy storage unit mounting member and energy storage units inter-connecting member, wherein each one of the first and second energy storage units comprises a plurality of battery packs arranged in a stack configuration along the longitudinal direction, wherein the first energy storage unit mounting member is connectable to the first energy storage unit of the ESS, and further being arranged at a first vertical position for connecting to a vehicle mounting member, the energy storage unit mounting member comprising a connecting portion configured to connect with a vehicle mounting member; and the energy storage units inter-connecting member is connectable to the first energy storage unit of the ESS at a second vertical position, wherein said first vertical position is vertically above said second vertical position, and further configured to transversely inter-connect the first energy storage unit with a transversely opposite second energy storage unit; wherein the plurality of battery packs is arranged in the stack configuration via a number of inter-leaved portions interconnecting longitudinal opposite arranged battery packs.

17. A method for mounting an energy storage system ("ESS") to a longitudinal frame of a vehicle, said longitudinal frame having a vehicle mounting member and the energy storage system comprising a plurality of energy storage units, each one of the plurality of energy storage units having a corresponding energy storage unit mounting member, wherein the ESS further comprises an energy storage units inter-connecting member, the method comprising:

positioning an energy storage unit mounting member of a first energy storage unit in a facing relationship with a corresponding vehicle mounting member on a first transverse side of the longitudinal frame;

transversely moving the energy storage unit mounting member towards the vehicle mounting member until a connecting portion of the energy storage unit mounting member forms a connection with the vehicle mounting member on the first transverse side;

positioning an energy storage unit mounting member of a second energy storage unit in a facing relationship with a corresponding vehicle mounting member on a second transverse side of the longitudinal frame, the second transverse side being opposite arranged the first transverse side, wherein each one of the first and second energy storage units comprises a plurality of battery packs arranged in a stack configuration along the longitudinal direction;

transversely moving the energy storage unit mounting member of the second energy storage unit towards the corresponding vehicle mounting member until a connecting portion of the energy storage unit mounting member forms a connection with the corresponding vehicle mounting member on the second transverse side; and transversely inter-connecting the opposite first and second energy storage units by the energy storage units inter-connecting member, wherein the plurality of battery packs is arranged in the stack configuration via a number of inter-leaved portions interconnecting longitudinal opposite arranged battery packs.

* * * * *